United States Patent
Hiwatashi et al.

(10) Patent No.: US 11,824,244 B2
(45) Date of Patent: Nov. 21, 2023

(54) FUEL CELL STACK, FUEL CELL MODULE, POWER GENERATION SYSTEM, AND METHOD OF PRODUCING FUEL CELL STACK

(71) Applicant: Mitsubishi Power, Ltd., Kanagawa (JP)

(72) Inventors: Kenichi Hiwatashi, Yokohama (JP); Shin Yoshida, Yokohama (JP); Kenta Araki, Yokohama (JP); Kensuke Sameshima, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 126 days.

(21) Appl. No.: 17/429,794

(22) PCT Filed: Nov. 26, 2019

(86) PCT No.: PCT/JP2019/046130
§ 371 (c)(1),
(2) Date: Aug. 10, 2021

(87) PCT Pub. No.: WO2020/174788
PCT Pub. Date: Sep. 3, 2020

(65) Prior Publication Data
US 2022/0123345 A1 Apr. 21, 2022

(30) Foreign Application Priority Data
Feb. 28, 2019 (JP) .................... 2019-035615

(51) Int. Cl.
*H01M 8/2465* (2016.01)
*H01M 8/2428* (2016.01)
(Continued)

(52) U.S. Cl.
CPC ...... *H01M 8/2465* (2013.01); *H01M 8/04111* (2013.01); *H01M 8/2428* (2016.02);
(Continued)

(58) Field of Classification Search
CPC .......... H01M 8/2465; H01M 8/04111; H01M 8/2428; H01M 8/0245; H01M 8/0236;
(Continued)

(56) References Cited

U.S. PATENT DOCUMENTS 10,511,033 B2 12/2019 Koga et al.
2016/0133955 A1* 5/2016 Ozawa ................ H01M 8/249
429/439

FOREIGN PATENT DOCUMENTS

JP 3064087 7/2000
JP 2005-149995 6/2005
(Continued)

OTHER PUBLICATIONS

International Preliminary Report on Patentability dated Sep. 10, 2021 in International Application No. PCT/JP2019/046130, with English language translation.
(Continued)

*Primary Examiner* — Matthew W Van Oudenaren
(74) *Attorney, Agent, or Firm* — Wenderoth, Lind & Ponack, L.L.P.

(57) ABSTRACT

A fuel cell stack includes: a substrate; a first fuel cell including a fuel side electrode, an electrolyte, and an oxygen side electrode on the substrate, the first fuel cell being a single fuel cell; a second fuel cell including a fuel side electrode, an electrolyte, and an oxygen side electrode on the substrate, the second fuel cell being a single fuel cell; an interconnector film electrically connecting the fuel side electrode of the first fuel cell and the oxygen side electrode of the second fuel cell; and a porous ceramic film covering at least the interconnector film in a region between the fuel side electrode of the first fuel cell and the fuel side electrode of the second fuel cell.

13 Claims, 4 Drawing Sheets

(51) Int. Cl.
  *H01M 8/04111* (2016.01)
  *H01M 8/0228* (2016.01)
  *H01M 8/2418* (2016.01)
  *H01M 8/0236* (2016.01)
  *H01M 8/0215* (2016.01)

(52) U.S. Cl.
  CPC ........ *H01M 8/0215* (2013.01); *H01M 8/0228* (2013.01); *H01M 8/0236* (2013.01); *H01M 8/2418* (2016.02)

(58) Field of Classification Search
  CPC .. H01M 8/0215; H01M 8/0228; H01M 8/243; H01M 8/2432; H01M 8/0252; H01M 8/2418; H01M 2008/1293
  See application file for complete search history.

(56) References Cited

FOREIGN PATENT DOCUMENTS

| | | | |
|---|---|---|---|
| JP | 4146738 | | 9/2008 |
| JP | 4913527 | | 4/2012 |
| JP | 5062789 | | 10/2012 |
| JP | 2014-78455 | | 5/2014 |
| JP | 2014078455 | * | 5/2014 |
| JP | 2016-91968 | | 5/2016 |
| JP | 2017-183209 | | 10/2017 |
| JP | 2017183209 | * | 10/2017 |
| JP | 2018-106887 | | 7/2018 |

OTHER PUBLICATIONS

International Search Report dated Jan. 28, 2020 in International Application No. PCT/JP2019/046130, with English-language translation.

* cited by examiner

US 11,824,244 B2

FUEL CELL STACK, FUEL CELL MODULE, POWER GENERATION SYSTEM, AND METHOD OF PRODUCING FUEL CELL STACK

TECHNICAL FIELD

The present disclosure relates to a fuel cell stack, a fuel cell module including the fuel cell stack, a power generation system including the fuel cell module, and a method of producing a fuel cell stack.

BACKGROUND

As the next generation energy, fuel cells are known to generate power through chemical reaction between a fuel gas supplied to a fuel side electrode and an oxidizing gas supplied to an oxygen side electrode, with a single fuel cell composed of the fuel side electrode, electrolyte, and oxygen side electrode as the smallest unit.

Of these, a solid oxide fuel cell (SOFC) uses ceramic such as zirconia ceramic as the electrolyte and operates by fuel such as city gas, natural gas, petroleum, methanol, or coal gasification gas. Such a SOFC is known as a highly efficient high temperature fuel cell with a wide range of applications because of a high operating temperature of about 700 to 1000° C. to increase ionic conductivity. The SOFC can be combined with a rotating device such as a gas turbine, a micro gas turbine, or a turbocharger, for example, to increase the operating pressure for more efficient power generation. In this pressurized power generation system, compressed air discharged from a compressor is supplied to the oxygen side electrode of the SOFC as the oxidizing gas, and hot exhaust fuel gas discharged from the SOFC is supplied to a combustor at the inlet of the rotating device such as a gas turbine for combustion of the fuel gas. The hot combustion gas generated in the combustor is used to rotate the rotating device so as to recover the power.

A fuel cell module is configured to form a cell stack with a plurality of single fuel cells, and to form a power generation chamber with a plurality of cell stacks accommodated in a casing, for example. The single fuel cell has a fuel gas passage and an oxidizing gas passage. The fuel gas passage is supplied with a fuel gas through a fuel gas supply pipe, and the oxidizing gas passage is supplied with an oxidizing gas (e.g., air) through an oxidizing gas supply pipe.

The cell stack is formed in a cylindrical shape or a flat shape depending on the shape of a substrate on which the single fuel cells are loaded. JP 3064087 B discloses a method of producing a cylindrical cell stack in which materials constituting a single fuel cell is applied to the surface of a cylindrical substrate tube and fired.

SUMMARY

Problems to be Solved

In the practical application of fuel cells, it is necessary to improve the oxidation resistance (robustness) of single fuel cells while reducing the cost due to performance improvement. In the single fuel cell including a solid electrolyte such as SOFC, the performance can be improved by using a thin solid electrolyte, but since the film strength decreases with the thin film, cracks are more likely to occur due to thermal stress generated by temperature changes. If cracks occur, the oxidizing gas may enter the fuel side electrode under a high temperature environment in an emergency situation where the fuel gas supply is stopped due to abnormality or failure, and the fuel side electrode may be oxidized and damaged in a short time.

An object of an embodiment of the present disclosure is to improve the oxidation resistance (robustness) of the single fuel cells, thereby preventing the dense film such as the electrolyte constituting the single fuel cell from being damaged in a short time even during an emergency stop where the supply of fuel gas is stopped.

Solution to the Problems (1) A fuel cell stack according to an embodiment comprises: a substrate; a plurality of single fuel cells each of which includes a fuel side electrode, an electrolyte, and an oxygen side electrode deposited on the substrate; an interconnector film electrically connecting the fuel side electrode of one single fuel cell of adjacent single fuel cells of the plurality of single fuel cells and the oxygen side electrode of the other single fuel cell; and a porous ceramic film covering at least the interconnector film in a region between a first fuel side electrode of one single fuel cell of adjacent single fuel cells and a second fuel side electrode of the other single fuel cell.

Generally, each of the single fuel cells constituting the fuel cell stack prevents the oxidizing gas at the oxygen side electrode from entering the fuel side electrode by providing the interconnector film and the electrolyte composed of dense films that do not allow the permeation of the oxidizing gas to cover the fuel side electrodes of the single fuel cells. However, in the region between the fuel side electrodes of adjacent single fuel cells, local stress is likely to occur due to the large amount of thermal change caused by the temperature difference between the fuel side electrodes. In particular, the end portion of the interconnector film is prone to stress concentration due to the difference in thermal expansion coefficient between the interconnector film and other components. Therefore, with the above configuration (1), since the porous ceramic film is disposed to cover at least the interconnector film in the region between the fuel side electrodes of adjacent single fuel cells, the porous ceramic film mitigates the stress generated in the electrolyte and the interconnector film and reduces the damage to the dense film. Thus, it is possible to improve the oxidation resistance (robustness) of the single fuel cells.

Herein, the oxidizing gas is a gas that contains about 15% to 30% oxygen, typically air is suitable, but other gases can also be used, such as a mixture of combustion flue gas and air, or a mixture of oxygen and air.

The porous ceramic film covers the interconnector film to function as a strength member of the interconnector film and to mitigate the stress generated in the electrolyte and the interconnector film in the region between the fuel side electrodes due to the temperature difference between the fuel side electrodes. In addition, since the local stress of the porous ceramic film is lower than that of the dense film, even if small cracks occur in the electrolyte or the interconnector film, the porous ceramic film can suppress the crack extension.

(2) In an embodiment, in the above configuration (1), the interconnector film extends from the first fuel side electrode toward the second fuel side electrode in the region between the fuel side electrodes, and extends just before the second fuel side electrode.

With the above configuration (2), since the interconnector film extends to the intermediate region between fuel side electrodes, a bilayer structure of the interconnector film and the porous ceramic film can be formed in the intermediate region between fuel side electrodes. Thus, it is possible to improve the oxidation resistance in the intermediate region between fuel side electrodes.

(3) In an embodiment, in the above configuration (1), the interconnector film extends from the first fuel side electrode toward the second fuel side electrode in the region between the fuel side electrodes, and reaches the second fuel side electrode.

With the above configuration (3), since the interconnector film extends from the first fuel side electrode to reach the second fuel side electrode, the entire area of the intermediate region between fuel side electrodes can be covered with the bilayer structure. Thus, it is possible to improve the oxidation resistance in the intermediate region between fuel side electrodes.

(4) In an embodiment, in the above configuration (3), the second fuel side electrode has a slope portion whose thickness gradually decreases toward the first fuel side electrode, and the interconnector film extends to a slope region middle portion of the slope portion.

With the above configuration (4), since the interconnector film extends to the slope region middle portion of the slope portion of the second fuel side electrode, the oxidation resistance can be improved in the intermediate region between fuel side electrodes. Further, since the interconnector film does not extend beyond the midpoint of the slope portion, it does not reduce the power generation area formed at the second fuel side electrode. This prevents a reduction in power generation performance.

(5) In an embodiment, in the above configuration (4), the interconnector film extends to a region of 30% or more and 70% or less of the slope portion in a slope direction.

With the above configuration (5), since the interconnector film extends to a region of 30% to 70% of the slope portion of the second fuel side electrode in the slope direction, the oxidation resistance can be improved in the intermediate region between fuel side electrodes, and the reduction in power generation performance can be prevented.

(6) In an embodiment, in any one of the above configurations (1) to (5), the porous ceramic film extends from the first fuel side electrode toward the second fuel side electrode in the region between the fuel side electrodes, and reaches the second fuel side electrode. The second fuel side electrode has a slope portion whose thickness gradually decreases toward the first fuel side electrode, and the porous ceramic film extends to at least a partial region of the slope portion.

With the above configuration (6), since the porous ceramic film extends from the first fuel side electrode to at least a partial region of the slope portion of the second fuel side electrode, the stress generated in the intermediate region between fuel side electrodes is mitigated, and the damage to the dense film is suppressed, so that the oxidation resistance can be improved. On the other hand, since the porous ceramic film does not extend beyond the slope portion of the second fuel side electrode toward the second fuel side electrode, it does not reduce the power generation performance at the second fuel side electrode.

(7) In an embodiment, in the above configuration (6), the porous ceramic film extends to a region ½ or less of the slope portion in a slope direction.

With the above configuration (7), since the porous ceramic film extends from the first fuel side electrode to a region ½ or less of the slope portion of the second fuel side electrode in the slope direction, the oxidation resistance can be improved in the intermediate region between fuel side electrodes. Further, since the porous ceramic film does not extend beyond ½ of the slope portion in the slope direction toward the second fuel side electrode, it does not lead to a thickness reduction of the oxygen side electrode disposed outside the second fuel side electrode, thus preventing the reduction in performance of the oxygen side electrode.

(8) In an embodiment, in any one of the above configurations (1) to (7), the electrolyte is disposed on the substrate side of the interconnector film in the region between the fuel side electrodes, and extends from the second fuel side electrode to the first fuel side electrode.

With the above configuration (8), since the electrolyte extends to the intermediate region between fuel side electrodes, a thick electrolyte can be formed in the intermediate region between fuel side electrodes. Thus, it is possible to increase the strength of the electrolyte in the intermediate region between fuel side electrodes, and improve the oxidation resistance.

(9) In an embodiment, in any one of the above configurations (1) to (8), the porous ceramic film is composed of a material with a porosity of 10% or more and 60% or less.

With the above configuration (9), since the porous ceramic film is composed of a material with a porosity of 10% or more, the stress generated in the intermediate region between fuel side electrodes can be mitigated. Further, a porosity of 60% or less can reduce the permeation amount of oxygen through gas diffusion. In addition, since the porous ceramic film is less prone to local stress, even if cracks occur in the electrolyte or the interconnector film, the porous ceramic film can prevent the crack extension.

(10) In an embodiment, in any one of the above configurations (1) to (9), the interconnector film is composed of a material with a porosity of 0.1% or more and 5% or less.

With the above configuration (10), since the interconnector film has a porosity of 0.1% or more, the extension of micro-cracks can be reduced. Further, a porosity of 5% or less indicates that there are no pores penetrating the film, which prevents the penetration of oxidizing gas even in the intermediate region between fuel side electrodes, thus improving the oxidation resistance of the single fuel cells.

(11) In an embodiment, in any one of the above configurations (1) to (10), the electrolyte is composed of a film with a thickness of 5 μm or more and 20 μm or less.

With the above configuration (11), since the electrolyte is composed of a thin film with a thickness of 20 μm or less, the power generation performance can be improved compared to conventional one. Further, since the thickness is 5 μm or more, the required film strength can be maintained.

(12) In an embodiment, in any one of the above configurations (1) to (11), the porous ceramic film and the interconnector film are made of the same material.

With the above configuration (12), the porous ceramic film can mitigate the stress in the electrolyte and the interconnector film, reduce the oxygen gas permeability, and prevent the expansion due to the reducing gas.

(13) A fuel cell module according to an embodiment comprises: an assembly of a plurality of the fuel cell stacks having any one of the above configurations (1) to (12).

With the above configuration (13), since the module includes the fuel cell stack with an improved oxidation resistance (robustness), the durability can be improved. As a result, the frequency of repairs can be reduced, and the operation time can be elongated, so that the power generation efficiency can be improved.

(14) A power generation system according to an embodiment comprises: the fuel cell module having the above configuration (13); and a rotating device configured to generate a rotational power by using an exhaust fuel gas and an exhaust oxidizing gas discharged from the fuel cell module. The fuel cell module is supplied with the oxidizing gas compressed by using the rotational power, and the fuel cell module generates power by using the fuel gas and the compressed oxidizing gas.

With the above configuration (14), while achieving the object of the present disclosure, the power generation efficiency can be improved by supplying compressed oxidizing gas to the fuel cell module, and the power required for the power generation system can be reduced with improved power generation efficiency by generating the rotational power using the exhaust fuel gas and the exhaust oxidizing gas from the fuel cell module.

(15) In an embodiment, in the above configuration (14), the rotating device comprises a gas turbine or a turbocharger.

With the above configuration (15), in addition to improving the power generation efficiency and reducing the power required for the power generation system, since the rotating device is a gas turbine, combined power generation can be achieved with the fuel cell module and the gas turbine.

(16) A method of producing a fuel cell stack according to an embodiment comprises: a step of depositing a fuel side electrode, a fuel side electrode reaction layer, and an electrolyte, and an interconnector film on a substrate and sintering the deposit to obtain a sintered body; a step of depositing a porous ceramic film, an interconnector intermediate layer, an oxygen side electrode reaction layer, and an oxygen side electrode on the sintered body and firing the deposit to obtain a fired body; and a step of applying a reduction process to the fired body.

With the above method (16), the fuel cell stack described in any one of the above (1) to (12) can be produced.

Advantageous Effects

According to some embodiments, even during an emergency stop where the supply of fuel gas is stopped, it is possible to suppress the damage to the electrolyte and the interconnector film caused by oxidizing gas entering the fuel side electrode, and improve the oxidation resistance (robustness) of the single fuel cells.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
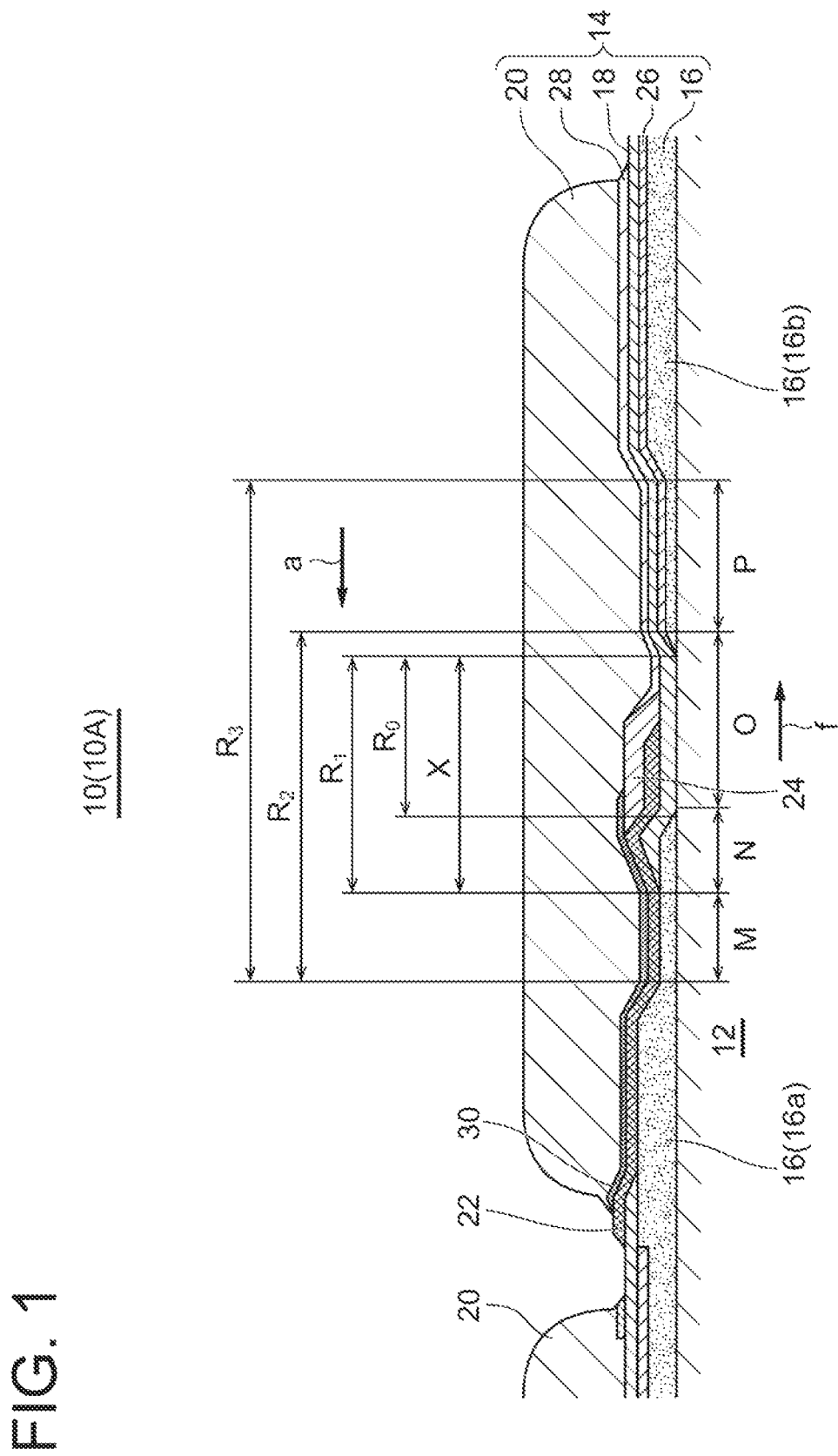
FIG. 1 is a schematic longitudinal cross-sectional view of a fuel cell stack according to an embodiment.
Figure 2:
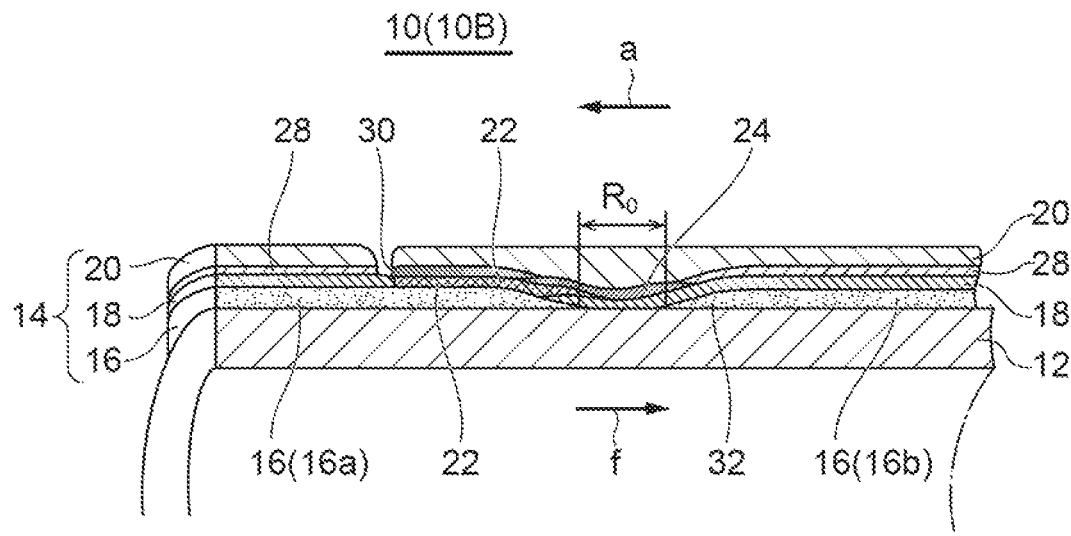
FIG. 2 is a longitudinal cross-sectional view of a fuel cell stack according to an embodiment.
Figure 3:
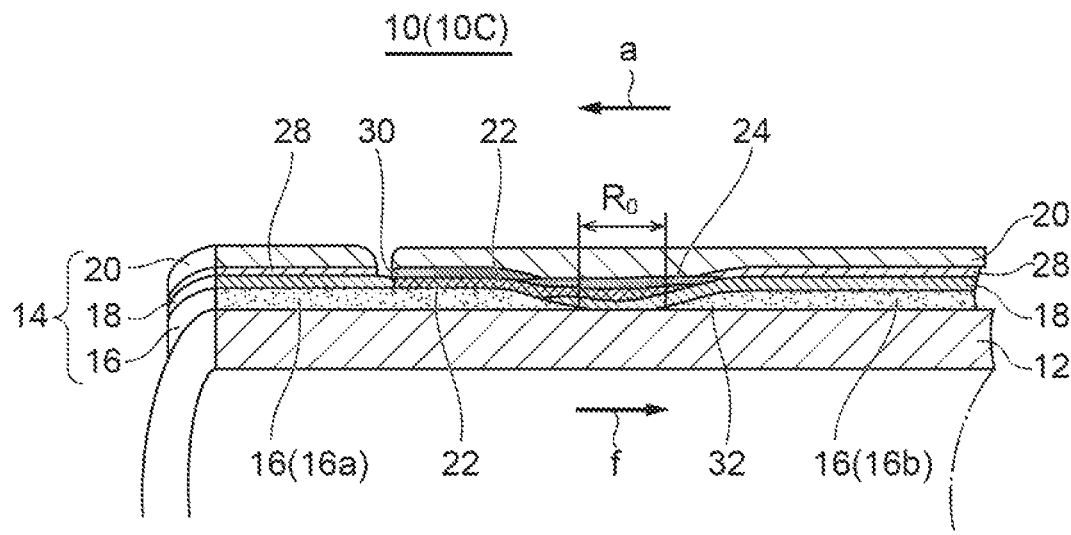
FIG. 3 is a longitudinal cross-sectional view of a fuel cell stack according to an embodiment.
Figure 7:
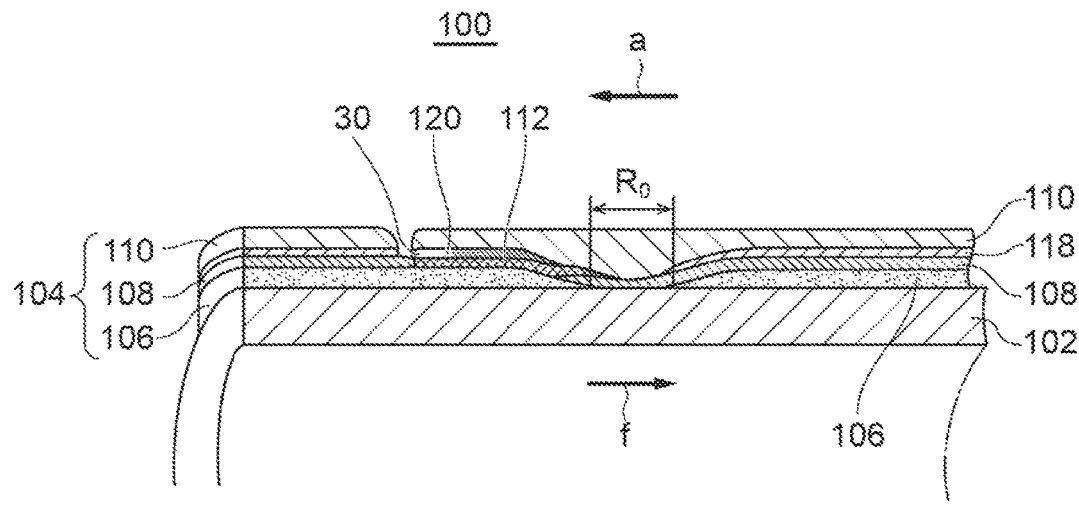
FIG. 7 is a longitudinal cross-sectional view of a conventional fuel cell stack.

FIG. 1 is a schematic longitudinal cross-sectional view of a fuel cell stack according to an embodiment. FIGS. 2 and 3 are a longitudinal cross-sectional view of a fuel cell stack according to some embodiments. FIG. 7 is a longitudinal cross-sectional view of a conventional fuel cell stack.

In FIGS. 1 to 3, the fuel cell stack 10 (10A, 10B, 10C) according to some embodiments includes a substrate 12 and a plurality of single fuel cells 14 loaded on the substrate 12. Each of the single fuel cells 14 includes a film-like fuel side electrode 16, electrolyte 18, and oxygen side electrode 20 deposited on the substrate 12 in this order. The fuel side electrode 16 and the oxygen side electrode 20 of adjacent single fuel cells 14 are electrically connected by a conductive interconnector film 22. The interconnector film 22 electrically connects the plurality of single fuel cells 14 supported on the substrate 12 in series.

The passage for the fuel gas f is formed closer to the substrate 12, and the passage for the oxidizing gas a is formed closer to the oxygen side electrode 20. As the oxidizing gas a, for example, air is used. By using the fuel gas f and the oxidizing gas a as raw materials, chemical reactions occur at the fuel side electrode 16 and the oxygen side electrode 20, causing oxygen ions to move through the electrolyte 18 to generate power. The power electrically connected in series by the interconnector film 22 is taken out by a lead film (not shown) at the end of the substrate 12. The fuel cell module has a power generation chamber composed of a plurality of cell stacks 10. Each single fuel cell 14 includes a porous ceramic film 24 at least covering the interconnector film 22 in a region R0 (see FIG. 1) between the fuel side electrodes 16 of adjacent single fuel cells 14.

Since the interconnector film 22 and the electrolyte 18 composed of dense films that do not allow the permeation of the oxidizing gas a are provided so as to cover the fuel side electrodes of the single fuel cells 14, the oxidizing gas a at the oxygen side electrode 20 is prevented from entering the fuel side electrode 16. However, in the intermediate region between fuel side electrodes R0 between adjacent single fuel cells 14, local stress is likely to occur due to the large amount of thermal change caused by the temperature difference between the fuel side electrodes 16. In particular, the end portion of the interconnector film 22 is prone to stress concentration due to the difference in thermal expansion coefficient between the interconnector film 22 and other components and the difference in thermal expansion coefficient during firing.

The following explains the mechanism of damage to the single fuel cell 14 during load interruption where the fuel gas supply is stopped due to abnormality or failure in the fuel cell stack 10.

(1) When the load is cut off, the temperature of the single fuel cell 14 (near the electrolyte 18) suddenly drops and the single fuel cell 14 contracts because there is no more heat generated by power generation, so that tensile stress is generated in the region R0. If the thicknesses of the electrolyte 18 and the interconnector film 22 are small, cracks occur in these dense films. Since the heat capacity of the substrate 12 is overwhelmingly larger than that of the other components, the substrate 12 basically does not change in temperature.

(2) The cracks allow oxygen to penetrate from the oxygen side electrode 20 to the fuel side electrode 16 and oxidize the fuel side electrode 16, which leads to volume expansion.

(3) The volume expansion of the fuel side electrode 16 causes cracks in the electrolyte 18 in contact with the fuel side electrode 16, resulting in leakage of the fuel gas f.

(4) The leaked fuel gas f is combusted in the single fuel cell 14, degrading the performance of the single fuel cell 14 and increasing the damage.

In the present embodiment, in the region R0, the porous ceramic film 24 covers the interconnector film 22 to function as a strength member of the interconnector film 22 and to mitigate the stress generated in the electrolyte 18 and the interconnector film 22 in the intermediate region between fuel side electrodes due to the temperature difference between the fuel side electrodes 16. In addition, since the porous ceramic film 24 is less prone to local stress, even if fine cracks occur in the electrolyte 18 or the interconnector film 22, the crack extension can be suppressed, so that the porous ceramic film 24 can prevent the penetration of the oxidizing gas a. Thus, it is possible to improve the oxidation resistance (robustness) of the single fuel cells 14.

In FIG. 1, the region R0 (O) formed between adjacent fuel side electrodes 16 is a region where local stress is likely to occur due to the large amount of thermal change caused by the temperature difference between the fuel side electrodes 16. The region R1 (X) is a region that does not affect the power generation performance of the single fuel cell 14, where the porous ceramic film 24 is disposed. The porous ceramic film 24 in the region R1 does not affect the power generation performance. The region R2 (O+M+N) is a region where the influence on the power generation performance is small, and the region R3 (O+M+N+P) is the maximum region where the influence on power generation performance can be minimized. If the installation area of the interconnector film 22 and the porous ceramic film 24 exceeds the region P, the power generation performance decreases.

The thickness of each element constituting the single fuel cell 14 is in the order of microns. Among these elements, the oxygen side electrode 20 has the maximum thickness. The porous ceramic film 24 is preferably about 20 to 100 μm. If it is thinner, the stress mitigation effect decreases. On the other hand, if it is too thick, the oxygen side electrode 20 becomes thinner, and the performance of the oxygen side electrode 20 may degrade.

In an embodiment, the porous ceramic film 24 and the interconnector film 22 are made of the same material. The porous ceramic film 24 is required to have the same properties as the interconnector film 22 in terms of reducing expansion, thermal expansion coefficient, and oxidation resistance. Therefore, the porous ceramic film 24 is preferably made of the same material as the interconnector film 22. For example, a $SrTiO_3$-based material may be used for the interconnector film 22 and the porous ceramic film 24. The porous ceramic film 24 may be made of a material that is designed to be exposed to a reducing atmosphere. For example, lanthanum chromite or $SrTiO_3$ may be used for the interconnector film 22 and the porous ceramic film 24.

FIG. 7 shows a conventional fuel cell stack 100. The fuel cell stack 100 includes a substrate 102 and a plurality of single fuel cells 104 loaded on the substrate 102. Each of the single fuel cells 104 includes a fuel side electrode 106, an electrolyte 108, and an oxygen side electrode 110 deposited on the substrate 102 in this order. The fuel side electrode 106 and the oxygen side electrode 110 of adjacent single fuel cells 104 are electrically connected by a conductive interconnector film 112. This electrically connects the plurality of single fuel cells 104 supported on the substrate 102 in series.

The passage for the fuel gas f is formed closer to the substrate 102, and the passage for the oxidizing gas a is formed closer to the oxygen side electrode 110. Further, as with the fuel cell stack 10, by using the fuel gas f and the oxidizing gas a as raw materials, chemical reactions occur at the fuel side electrode 106 and the oxygen side electrode 110, causing oxygen ions to move through the electrolyte 108 to generate power. The power electrically connected in series by the interconnector film 112 for each substrate 102 is taken out by a lead film (not shown) at the end of the substrate 102. Since the fuel cell stack 100 is not provided with the porous ceramic film 24, it is less resistant to oxidation (robustness) than the embodiments shown in FIGS. 1 to 3.

In an embodiment, as shown in FIG. 1, a fuel side electrode reaction layer 26 is interposed between the fuel side electrode 16 and the electrolyte 18. Further, an oxygen side electrode reaction layer 28 is interposed between the electrolyte 18 and the oxygen side electrode 20. Further, an interconnector intermediate layer 30 is interposed between the interconnector film 22 and the oxygen side electrode 20. These reaction and intermediate layers are provided to reduce the reaction resistance of the interfaces between each element.

In an embodiment, in the fuel cell stack 10 (10A, 10B) shown in FIGS. 1 and 2, the interconnector film 22 extends from the fuel side electrode 16 (16a) (first fuel side electrode) toward the fuel side electrode 16 (16b) (second fuel side electrode) in the region R0, and extends just before the fuel side electrode 16 (16b).

According to this embodiment, since the interconnector film 22 extends to the region R0, a bilayer structure of the interconnector film 22 and the porous ceramic film 24 can be formed in the region R0. Thus, it is possible to prevent the oxidizing gas a from entering the fuel side electrode side in the region R0 and improve the oxidation resistance.

In an embodiment, in the fuel cell stack 10 (10C) shown in FIG. 3, the interconnector film 22 extends from the fuel side electrode 16 (16a) (first fuel side electrode) toward the fuel side electrode 16 (16b) (second fuel side electrode) in the region R0, and reaches the fuel side electrode 16 (16b).

According to this embodiment, since the entire area of the region R0 can be covered with the bilayer structure of the interconnector film 22 and the porous ceramic film 24, it is possible to prevent the oxidizing gas a from entering the fuel side electrode side in the region R0 and improve the oxidation resistance.

In an embodiment, as shown in FIG. 3, the fuel side electrode 16 (16b) has a slope portion 32 whose thickness gradually decreases toward the fuel side electrode 16 (16a), and the interconnector film 22 extends to a slope region middle portion of the slope portion 32.

According to this embodiment, since the interconnector film 22 extends to the slope region middle portion of the slope portion 32, the penetration of the oxidizing gas a in the region R0 can be prevented. Further, since the interconnector film 22 does not extend beyond the midpoint of the slope portion 32, it does not reduce the power generation area formed at the fuel side electrode 16 (16b). This prevents a reduction in power generation performance.

In an embodiment, the interconnector film 22 extends to a region of 30% or more and 70% or less of the slope portion 32 in the slope direction.

According to this embodiment, since the interconnector film 22 extends to a region of 30% to 70% of the slope portion 32, the oxidation resistance can be improved in the region R0, and the reduction in power generation performance at the fuel side electrode 16 (16b) can be prevented.

In an embodiment, as shown in FIGS. 2 and 3, the porous ceramic film 24 extends from the fuel side electrode 16 (16a) (first fuel side electrode) toward the fuel side electrode 16 (16b) (second fuel side electrode) in the region R0, and extends to at least a partial region of the slope portion 32.

According to this embodiment, the porous ceramic film 24 mitigates the stress generated in the electrolyte 18 and the interconnector film 22 in the region R0 and suppresses the damage to the dense film such as the electrolyte 18 and the interconnector film 22, so that the oxidation resistance of the single fuel cells 14 can be improved. On the other hand, since the porous ceramic film 24 does not extend beyond the slope portion 32 toward the fuel side electrode 16 (16b), it does not reduce the power generation performance due to power generation reaction at the fuel side electrode 16 (16b).

In an embodiment, the porous ceramic film 24 extends to a region ½ or less of the slope portion 32 in the slope direction. According to this embodiment, the porous ceramic film 24 can improve the oxidation resistance in the region R0. Further, since the porous ceramic film 24 does not extend beyond ½ of the slope portion 32 in the slope direction toward the fuel side electrode 16 (16b), it does not lead to a thickness reduction of the oxygen side electrode 20 disposed outside the fuel side electrode 16 (16b), thus preventing the reduction in performance of the oxygen side electrode 20.

In an embodiment, the electrolyte 18 is disposed on the substrate 12 side of the interconnector film 22 in the region R0, and extends from the fuel side electrode 16 (16b) to the fuel side electrode 16 (16a).

According to this embodiment, since the electrolyte 18 fills the region R0, a thick electrolyte can be formed in the region R0. Thus, it is possible to increase the strength of the electrolyte 18 in the intermediate region between fuel side electrodes, and improve the oxidation resistance of the single fuel cells 14.

In an embodiment, since the porous ceramic film 24 is composed of a material with a porosity of 10% or more, the stress generated in the intermediate region between fuel side electrodes can be mitigated. Further, a porosity of 60% or less can reduce the permeation amount of oxygen through gas diffusion. In addition, since the porous ceramic film 24 is less prone to local stress, even if cracks occur in the electrolyte 18 or the interconnector film 22, the porous ceramic film 24 can prevent the crack extension.

In an embodiment, the interconnector film 22 is composed of a material with a porosity of 0.1% to 5%. With this configuration, since the interconnector film 22 has a porosity of 0.1% or more, the extension of micro-cracks can be reduced. Further, a porosity of 5% or less indicates that there are no pores penetrating the film, which prevents the penetration of oxidizing gas a even in the intermediate region between fuel side electrodes R0, thus improving the oxidation resistance of the single fuel cells 14. Thus, the interconnector film 22 can prevent the penetration of oxidizing gas a even in the region R0 and improve the oxidation resistance of the single fuel cells 14.

In an embodiment, the electrolyte 18 is composed of a film with a thickness (thickness not at the end but at the center in the direction along the surface of the substrate 12) of 5 to 20 μm. When the electrolyte 18 has a thickness of 20 μm or less, which is thinner than the conventional one, the power generation performance can be improved. Further, when the thickness is 5 μm or more, the required film strength can be maintained.

In an embodiment, the substrate 12 comprises a substrate tube having an inner passage to which the fuel gas f is supplied. Since the fuel cell stack 10 is composed of a plurality of single fuel cells 14 supported on the substrate tube, a cylindrical cell stack is formed.

In another embodiment, the fuel cell stack may be a flat plate or flat cylindrical cell stack with a plurality of single fuel cells 14 supported on a flat substrate.

In an embodiment, the single fuel cell 14 comprises a SOFC in which the electrolyte 18 is composed of a solid oxide. SOFCs operate at a high temperature of 650 to 1000° C. When the current is cut off during an emergency stop, the temperature in the vicinity of the single fuel cells 14 drops rapidly because there is no more heat generated by power generation. As a result, tensile stress is generated in the region R0, which in turn causes cracks in the electrolyte 18 and the interconnector film 22 in the region R0, resulting in a reduction in oxidation resistance. However, according to the above-described embodiments, since the oxidation resistance can be improved, even when the current is cut off during an emergency stop, it is possible to suppress the damage to the electrolyte 18 and the interconnector film 22 caused by the oxidizing gas a reaching the fuel side electrode 16.

Preferably, the substrate 12 is about 1 to 3 mm thick to maintain the strength of the single fuel cells, and porous (30 to 50% porosity) to allow the fuel to pass through. Since it needs to be insulating, materials such as CSZ, $MgAl_2O_4$, and $SrZrO_3$ are used.

The fuel side electrode 16 is required to have a high electronic conductivity, a thermal expansion coefficient comparable to that of the electrolyte 18, be porous, and be stable in a reducing atmosphere. From this perspective, materials such as Ni and zirconia oxide cermet, Ni and ceria oxide are preferable. Further, a porosity of about 30 to 50% and a thickness of 50 to 200 μm are preferable.

The electrolyte 18 is required to block the fuel and air, and to allow oxygen ions to pass through. From this perspective, materials such as YSZ, ScSZ, LSGM, and ceria-based oxides are preferable, and a porosity of about 0.1 to 5% and a thickness of 5 to 50 μm (about 5 to 20 μm for higher output) are preferable.

The oxygen side electrode 20 is required to have a high electronic conductivity, a thermal expansion coefficient comparable to that of the electrolyte 18, be porous, and be stable in an oxidizing atmosphere. From this perspective, lanthanum manganite, lanthanum cobalt, and lanthanum iron materials are preferable, and a porosity of about 30 to 50% and a thickness of 100 to 1000 μm are preferable.

The interconnector film 22 is required to block the fuel and air, have a high electronic conductivity, and a thermal expansion coefficient comparable to that of the electrolyte 18. From this perspective, $SrTiO_3$ and lanthanum chromite materials are preferable, and a porosity of 0.1 to 5% and a thickness of 10 to 50 μm are preferable.

The porous ceramic film 24 is required to mitigate the stress in the electrolyte 18 and the interconnector film 22, have low oxygen gas permeability of the material itself, and not expand under the influence of reducing gas. From this perspective, the same material as the interconnector film 22 is preferable, such as $SrTiO_3$-based material and lanthanum chromite-based material. A porosity of about 10 to 60% and a thickness of 20 to 100 μm are preferable.

Figure 4:
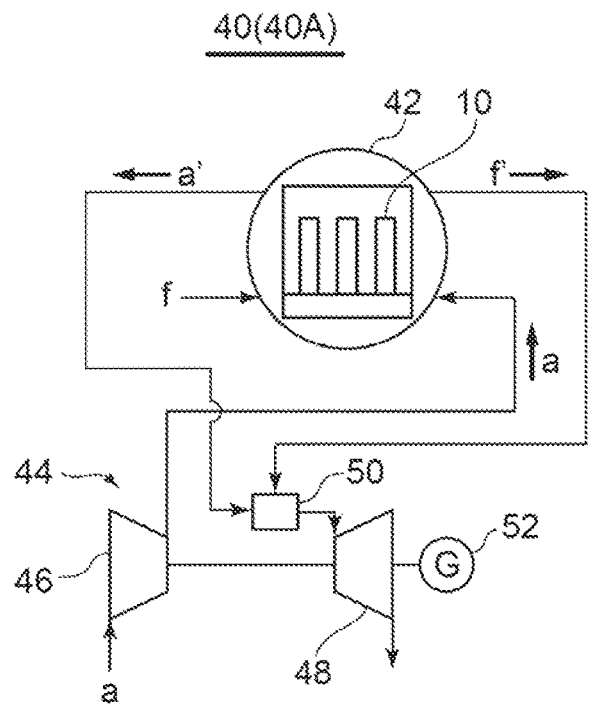
FIG. 4 is a system diagram of a power generation system according to an embodiment.
Figure 5:
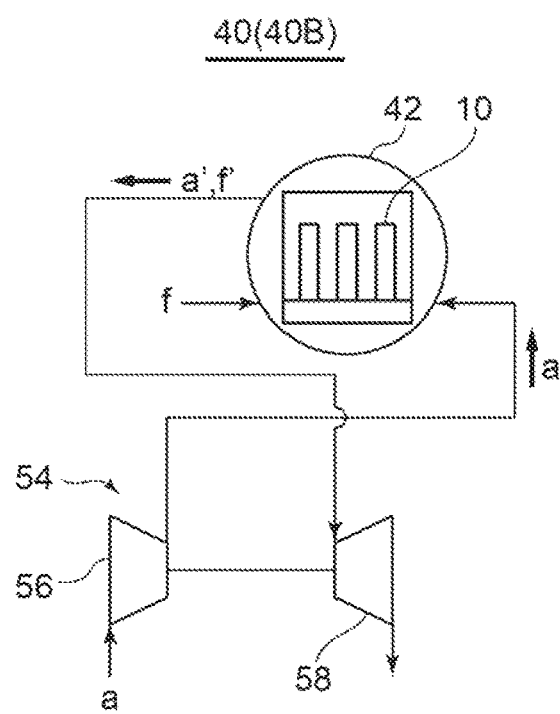
FIG. 5 is a system diagram of a power generation system according to an embodiment.

As shown in FIGS. 4 and 5, a fuel cell module 42 according to an embodiment is formed of an assembly of a plurality of fuel cell stacks 10 according to the above-described embodiments. With the fuel cell module 42, since the plurality of fuel cell stacks 10 with an improved oxidation resistance (robustness) are included, the durability can be improved. As a result, the frequency of repairs can be reduced, and the operation time can be elongated, so that the power generation efficiency can be improved.

The Fuel cell module may be applied to a combined cycle power generation system used in combination with a gas turbine combined cycle (GTCC), a micro gas turbine (MGT), or a turbocharger.

FIG. 4 is a system diagram of a power generation system 40 (40A) according to an embodiment. In FIG. 4, the power generation system 40 (40A) includes the fuel cell module 42 with the above configuration, and a gas turbine 44 (rotating device). The oxidizing gas a is supplied to a compressor 46 constituting the gas turbine 44. After being compressed by the compressor 46, the oxidizing gas a is supplied to the fuel cell module 42. The exhaust oxidizing gas a' and the exhaust fuel gas f' used in chemical reaction for power generation in the fuel cell module 42 are supplied to a combustor 50 constituting the gas turbine 44 to produce a hot combustion gas in the combustor 50. The rotational power generated by the adiabatic expansion of this combustion gas in an exhaust turbine 48 generates power in a power generator 52, and the rotational power drives the compressor 46 to generate a compressed gas. This compressed gas is supplied as the oxidizing gas a to fuel cell module 42. The fuel cell module 42 generates power using the compressed oxidizing gas a and fuel gas f.

With the above configuration, since the fuel cell module 42 includes a plurality of fuel cell stacks 10 with an improved oxidation resistance (robustness), the durability can be improved, and the frequency of repairs can be reduced. As a result, the operation time can be elongated, and the power generation efficiency can be improved. Further, since the compressed oxidizing gas a can be supplied to the fuel cell module 42, the power generation efficiency can be further improved. Further, since the combustor 50 is driven by the exhaust oxidizing gas a' and the exhaust fuel gas f' discharged from the fuel cell module 42 to generate a rotational power, the required power of the power generation system 40 (40A) can be reduced. Furthermore, since both the fuel cell module 42 and the gas turbine 44 can generate power in a combined manner, the power generation amount can be increased.

FIG. 5 is a system diagram of a power generation system 40 (40B) according to an embodiment. In the power generation system 40 (40B), a turbocharger 54 is used as the rotating device. In FIG. 5, the oxidizing gas a is supplied to a compressor 56 constituting the turbocharger 54 to compress the oxidizing gas, and the compressed oxidizing gas a is supplied to the fuel cell module 42. The exhaust oxidizing gas a' and the exhaust fuel gas f' used in chemical reaction for power generation in the fuel cell module 42 are supplied to an exhaust turbine 58 constituting the turbocharger 54 and rotates the exhaust turbine 58 to generate a rotational power. This rotational power drives the compressor 56 to generate a compressed gas.

According to this embodiment, since the fuel cell module 42 includes a plurality of fuel cell stacks 10 with an improved oxidation resistance (robustness), the durability of the module 42 can be improved, and the frequency of repairs can be reduced. As a result, the operation time can be elongated, and the power generation efficiency can be improved.

EXAMPLES

Example 1

For the substrate 12, CSZ material was selected, mixed with an appropriate amount of binder and water for extrusion molding, kneaded with a kneading machine, and then extruded to form a tube. For the fuel side electrode 16 and the fuel side electrode reaction layer 26, a mixture of NiO material and YSZ material was selected, and organic vehicle was added to this mixture and kneaded with three rolls to form a slurry. The fuel side electrode 16 was deposited on the surface of the substrate 12 by the screen printing method using the slurry. For the electrolyte 18, YSZ material was selected, and organic vehicle was added to form a slurry. The thickness of the electrolyte 18 was set to 40 μm. For the interconnector film 22, $SrTiO_3$ material was selected, and organic vehicle was added to form a slurry. The fuel side electrode 16, the fuel side electrode reaction layer 26, the electrolyte 18, and the interconnector film 22 were deposited on the surface of the substrate 12 in this order by the screen printing method and sintered at 1400 to 1450° C. (sintered body). The film configuration is as shown in FIG. 1.

For the porous ceramic film 24, $SrTiO_3$ material was selected, and organic vehicle was added to form a slurry. For the interconnector intermediate layer 30, $LaSrMnO_3$ material was selected, and organic vehicle was added to form a slurry. For the oxygen side electrode reaction layer 28, SDC material was selected, and organic vehicle was added to form a slurry. For the oxygen side electrode 20, LaSrCaMn-based material was selected, and organic vehicle was added to form a slurry. The porous ceramic film 24, the interconnector intermediate layer 30, the oxygen side electrode reaction layer 28, and the oxygen side electrode 20 were deposited on the surface of the sintered body in this order by the screen printing method and fired at 1200 to 1300° C. (fired body). Further, the fired body is subjected to the reducing process to produce the single fuel cell 14.

Example 2

The single fuel cell 14 was produced by the same process as in Example 1, except that the thickness of the electrolyte 18 was set to 20 μm.

Comparative Example

The single fuel cell 104 was produced by the same process as in Example 1, except that the porous ceramic film 24 is not formed.

Figure 6:
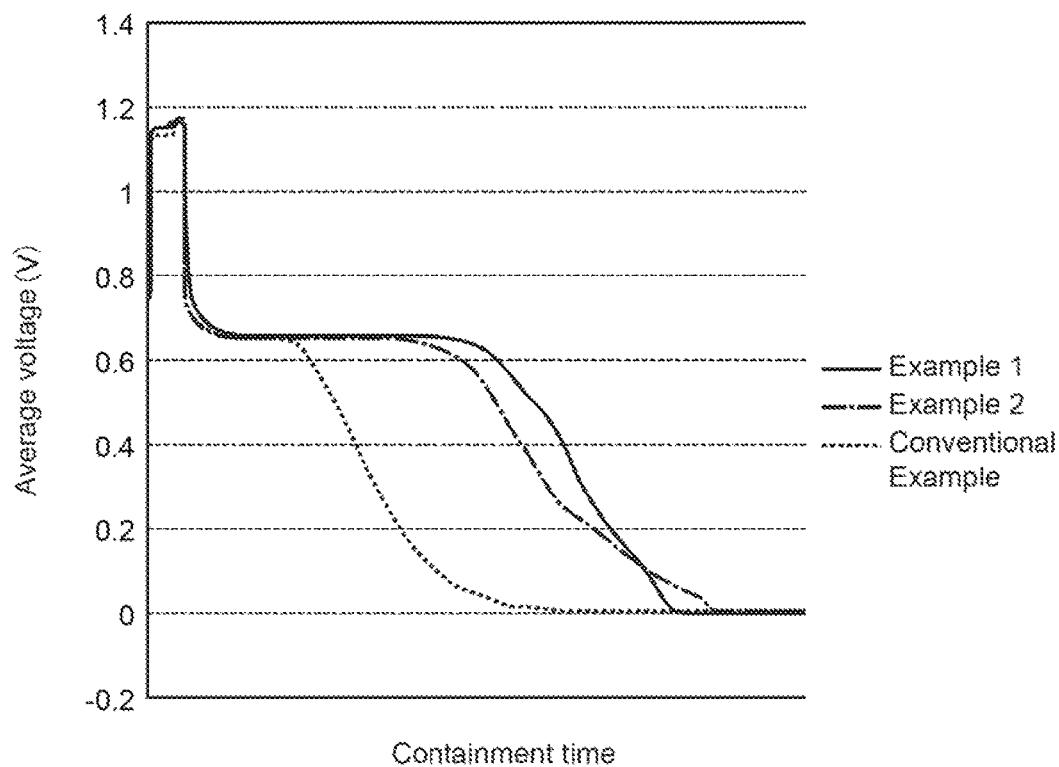
FIG. 6 is a graph showing a measurement result of the oxidation resistance of the fuel cell stack according to some embodiments.

FIG. 6 is a graph showing experimental results of the cylindrical cell stacks with SOFCs as the single fuel cells 14 in Example 1, Example 2, and Comparative Example. These cell stacks were used to generate power normally at 900° C., then the current was cut off and only the supply of fuel gas f to the fuel side electrode 16 was stopped (containment), and then the voltage of the cell stack was measured to see how the voltage decreased over time. FIG. 6, shows that the voltage retention time of the single fuel cell after containment is longer in Examples 1 and 2, where the porous ceramic film 24 is formed, than in Comparative Example, and the voltage retention time in Example 2, where the electrolyte 18 is made thinner, is about the same as Example 1. This indicates that the porous ceramic film 24 on the interconnector film 22 can suppress the damage to the electrolyte 18 and interconnector film 22 caused by the oxidizing gas a entering the fuel side electrode 16.

INDUSTRIAL APPLICABILITY

According to some embodiments, it is possible to improve the oxidation resistance (robustness) of the single fuel cells, and even during an emergency stop where the supply of fuel gas is stopped, it is possible to suppress the damage to the electrolyte and the interconnector film caused by oxidizing gas entering the fuel side electrode.

REFERENCE SIGNS LIST 10 (10A, 10B, 10C), 100 Fuel cell stack
12, 102 Substrate
14, 104 Single fuel cell
16 (16a, 16b), 106 Fuel side electrode
16 (16a) Fuel side electrode (First fuel side electrode)
16 (16b) Fuel side electrode (Second fuel side electrode)
18, 108 Electrolyte
20, 110 Oxygen side electrode
22, 112 Interconnector film
24 Porous ceramic film
26 Fuel side electrode reaction layer
28 Oxygen side electrode reaction layer
30 Interconnector intermediate layer
32 Slope portion
40 (40A, 40B) Power generation system
44 Gas turbine
46, 56 Compressor
48, 58 Exhaust turbine
50 Combustor
52 Power generator
54 Turbocharger
R0 Intermediate region between fuel side electrodes
a Oxidizing gas
a' Exhaust oxidizing gas
f Fuel gas
f' Exhaust fuel gas

The invention claimed is:

1. A fuel cell stack, comprising:
a substrate;
a first fuel cell including a fuel side electrode, an electrolyte, and an oxygen side electrode on the substrate, the first fuel cell being a single fuel cell;
a second fuel cell including a fuel side electrode, an electrolyte, and an oxygen side electrode on the substrate, the second fuel cell being a single fuel cell;
an interconnector film electrically connecting the fuel side electrode of the first fuel cell and the oxygen side electrode of the second fuel cell; and
a porous ceramic film covering at least the interconnector film in a region between the fuel side electrode of the first fuel cell and the fuel side electrode of the second fuel cell,
wherein the interconnector film extends from the fuel side electrode of the first fuel cell toward the fuel side electrode of the second fuel cell such that the interconnector film overlaps with the fuel side electrode of the second fuel cell.

2. The fuel cell stack according to claim 1,
wherein the fuel side electrode of the second fuel cell has a slope portion with a thickness which decreases toward the fuel side electrode of the first fuel cell, and the interconnector film extends to a point above a slope region middle portion of the slope portion.

3. The fuel cell stack according to claim 2,
wherein the point is above a region of 30% or more and 70% or less of a length of the slope portion in a slope direction.

4. The fuel cell stack according to claim 1,
wherein the porous ceramic film extends from a first point above the fuel side electrode of the first fuel cell toward the fuel side electrode of the second fuel cell such that the porous ceramic film overlaps with the fuel side electrode of the second fuel cell, and
wherein the fuel side electrode of the second fuel cell has a slope portion with a thickness which decreases toward the fuel side electrode of the first fuel cell, and the porous ceramic film extends to a second point above at least a partial region of the slope portion.

5. The fuel cell stack according to claim 4,
wherein the second point is above a region ½ or less of a length of the slope portion in a slope direction.

6. The fuel cell stack according to claim 1,
wherein the electrolyte of the second fuel cell is on a substrate side of the interconnector film, and extends from the fuel side electrode of the second fuel cell to the fuel side electrode of the first fuel cell.

7. The fuel cell stack according to claim 1,
wherein the porous ceramic film is composed of a material with a porosity of 10% or more and 60% or less.

8. The fuel cell stack according to claim 1,
wherein the interconnector film is composed of a material with a porosity of 0.1% or more and 5% or less.

9. The fuel cell stack according to claim 1,
wherein the electrolyte of the first fuel cell or the electrolyte of the second fuel cell is composed of a film with a thickness of 5 μm or more and 20 μm or less.

10. The fuel cell stack according to claim 1,
wherein the porous ceramic film and the interconnector film are made of a same material.

11. A fuel cell module comprising
a plurality of fuel cell stacks according to claim 1.

12. A power generation system, comprising:
the fuel cell module according to claim 11; and
a rotatable device configured to generate a rotational power using an exhaust fuel gas and an exhaust oxidation gas discharged from the fuel cell module,
wherein the fuel cell module is configured to be supplied with the exhaust oxidation gas which is compressed using the rotational power, and the fuel cell module is configured to generate power using the exhaust fuel gas and the exhaust oxidation gas which has been compressed.

13. The power generation system according to claim 12, wherein the rotatable device comprises a gas turbine or a turbocharger.

\* \* \* \* \*